(12) United States Patent
Ilstad et al.

(10) Patent No.: US 8,597,506 B2
(45) Date of Patent: Dec. 3, 2013

(54) SUBSEA GRAVITY SEPARATOR

(75) Inventors: Håvar Ilstad, Trondheim (NO); Hroar Andreas Nes, Trondheim (NO)

(73) Assignee: Statoil Petroleum AS, Stavanger (NO)

( * ) Notice: Subject to any disclaimer, the term of this patent is extended or adjusted under 35 U.S.C. 154(b) by 323 days.

(21) Appl. No.: 13/126,345

(22) PCT Filed: Oct. 28, 2008

(86) PCT No.: PCT/EP2008/009099
§ 371 (c)(1),
(2), (4) Date: Jul. 13, 2011

(87) PCT Pub. No.: WO2010/048969
PCT Pub. Date: May 6, 2010

(65) Prior Publication Data
US 2011/0259901 A1    Oct. 27, 2011

(51) Int. Cl.
*B01D 17/025* (2006.01)
*B01D 19/00* (2006.01)
*E21B 43/36* (2006.01)
*B01D 17/02* (2006.01)
*B65D 90/02* (2006.01)
*B65D 88/78* (2006.01)
*E21B 43/01* (2006.01)

(52) U.S. Cl.
CPC ............ *E21B 43/36* (2013.01); *B01D 17/0208* (2013.01); *B01D 19/00* (2013.01); *B65D 90/022* (2013.01); *B65D 88/78* (2013.01); *E21B 43/01* (2013.01)
USPC ................... 210/170.11; 210/532.1; 210/540; 96/184; 166/357; 166/75.12; 220/560.03; 220/660; 405/210; 29/428

(58) Field of Classification Search
USPC ................... 210/513, 532.1, 539, 540, 747.5; 95/253; 96/184; 166/75.12, 267, 357; 405/55, 210; 220/560.03, 586, 626, 220/660; 29/428
See application file for complete search history.

(56) References Cited

U.S. PATENT DOCUMENTS

| | | | | |
|---|---|---|---|---|
| 2,767,802 | A * | 10/1956 | Orrell | 96/184 |
| 3,688,473 | A * | 9/1972 | Brown | 96/184 |
| 3,777,497 | A * | 12/1973 | Edwards | 405/210 |
| 4,141,377 | A * | 2/1979 | Fernandez et al. | 405/210 |
| 5,081,761 | A * | 1/1992 | Rinehart et al. | 220/560.03 |
| 5,415,776 | A * | 5/1995 | Homan | 210/540 |
| 5,695,089 | A * | 12/1997 | Reese et al. | 220/560.03 |
| 5,837,152 | A * | 11/1998 | Komistek et al. | 210/540 |
| 6,164,872 | A * | 12/2000 | Morishige | 405/210 |
| 7,429,332 | B2 * | 9/2008 | Surjaatmadja et al. | 210/532.1 |
| 7,448,404 | B2 * | 11/2008 | Samuelsen et al. | 405/210 |

FOREIGN PATENT DOCUMENTS

| | | | |
|---|---|---|---|
| GB | 2 222 961 | * | 3/1990 |
| GB | 2 242 373 | * | 10/1991 |
| WO | WO 02/25160 | * | 3/2002 |

* cited by examiner

*Primary Examiner* — Christopher Upton
(74) *Attorney, Agent, or Firm* — Birch, Stewart, Kolasch & Birch, LLP

(57) ABSTRACT

A large diameter subsea gravity separator for ultra deep water conditions of 2000 to more than 4000 m includes a vessel having a shell which defines a cylindrical tubular portion and closure portions at axially both ends of the tubular portion. The shell is a sandwich shell which is dimensioned to provide for a predetermined collapse resistance of at least MPa and includes an inner steel layer, an outer steel layer and a concrete layer completely filling the space between the inner steel layer and the outer steel layer.

20 Claims, 1 Drawing Sheet

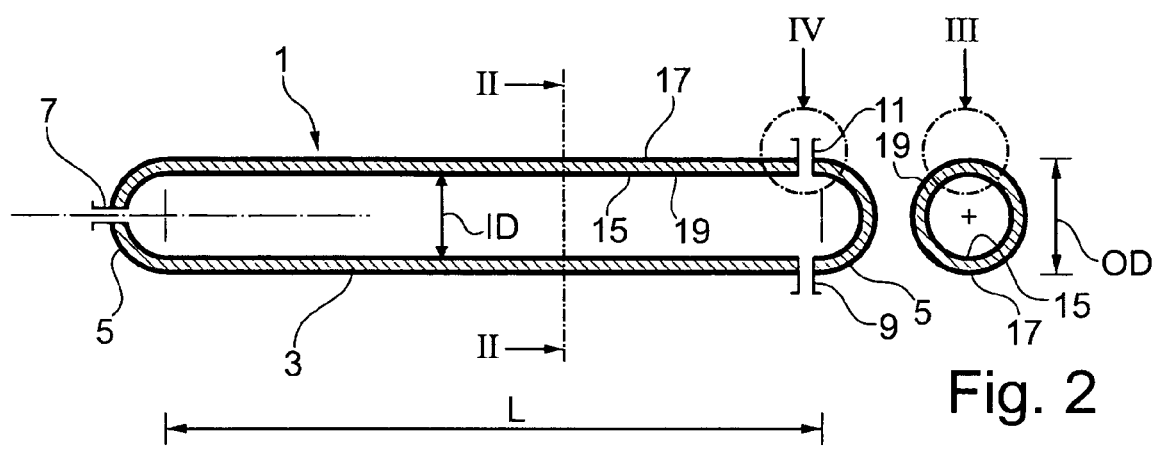
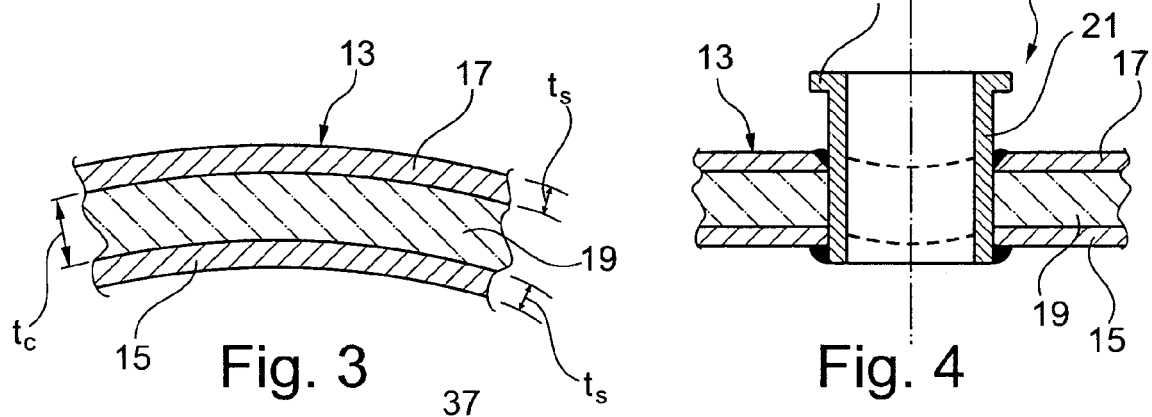
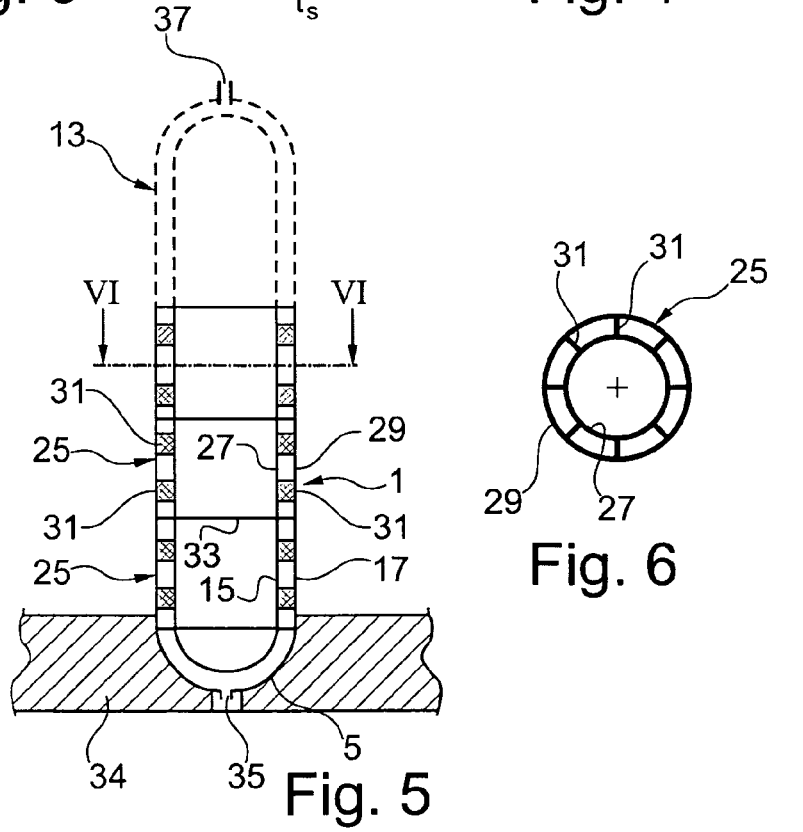

SUBSEA GRAVITY SEPARATOR

The invention relates to a subsea gravity separator and in particular a large diameter subsea gravity separator for use under ultra deep water conditions of more than 2 000 m water depth.

Conventional subsea separation technology requires a large diameter vessel with an internal volume of, for example, 50 to 80 m³ positioned on the seabed near a subsea offshore well head normally producing a mixture of fluids like oil and/or gas and/or water. The fluid mixture enters the separator vessel at an inlet port while the constituents leave at separate outlet ports as it is known, for example, from GB 2 242 373 A.

The vessel of known subsea separators has a full-steel shell and requires stiffening rings enclosing the outer circumference of the vessel as it is described in the Det Norske Veritas publication DNV-RP-F 301 "Subsea separator structural design", April 2007, which recommends general requirements for the design, the manufacture and testing of gravity separators intended for use in deep water applications where the governing load is the external pressure, rather than the internal pressure.

Traditional full-steel separators with an inner diameter of at least 2 m and a volume of 50 to 80 m³ have not been developed up to now for ultra deep water conditions of, for example, 3 000 m water depth due to the limitations related to the steel wall thickness and the corresponding weight. The separator vessel has to withstand extreme external pressure which has to be balanced by a high collapse resistance. The wall thickness is estimated in the range of 110 to 170 mm resulting in an extremely high weight of the vessel, which is additionally raised by the need of stiffening rings. Full-steel separators are therefore not feasible for use under ultra deep water conditions, in particular as the difficulties for installation and retrieval of the separator are to be taken in account.

From WO 02/25 160 A1, a pipeline to be used at a water depth of about 1 000 to 2 000 m is known. The pipeline has a thick-walled inner metal tube dimensioned to withstand the external pressure and a concrete layer surrounding the inner tube for thermal insulation. An outer thin-walled tube of metal or any other suitable material protects and seals the concrete layer.

From the article B. Montague "A simple composite construction for cylindrical shells subjected to external pressure", Journal Mechanical Engineering Science, vol. 17, No. 2, 1975, pages 105 to 113, a small cylindrical vessel capable of being externally pressurized is known. The vessel has a shell consisting of two thin steel membranes with a intervening filler made of an epoxy-resin which is intended to continue carrying load after the membranes have yielded. A similar small vessel is known from the article B. Montague and K. Kormi "Double-skin composite vessels to withstand external pressure" published in "Offshore Structures Engineering III", Gulf Publishing Company, Houston, 1982, pages 331 to 363 and from the article of P. Montague "The failure of double-skinned composites, circular cylindrical shells under external pressure", Journal Mechanical Engineering Science, vol. 20, No. 1, 1978, pages 35 to 48. The articles mentioned above discuss the collapse behavior of double-walled composite shells.

It is a main object of the invention to provide a subsea gravity separator which can be used under ultra deep water conditions, in particular at water depths of more than 2 000 m.

The invention provides for a subsea gravity separator comprising a vessel having a shell which defines a cylindrical tubular portion and closure portions at (axially) both ends of the tubular portion, the vessel further having a fluid inlet port and at least two fluid outlet ports, wherein the tubular portion has an inner diameter of at least 2 m and an axial length of at least 10 m, and is characterized in that the shell is a sandwich shell which is dimensioned to provide for a predetermined collapse resistance of at least 30 MPa and comprises an inner steel layer, an outer steel layer and a concrete layer supported between the inner steel layer and the outer steel layer providing composite action between the inner and the outer steel layer.

The invention is based on the finding that using a sandwich shell as described above, it is possible to construct a large volume vessel for use as a large diameter subsea gravity separator that can withstand extremely high external pressure present in ultra deep water applications, for example, at a water depth between 2 000 and 4 000 m. The surprising result of the findings was that, through the design of the sandwich shell according to the invention, it is possible to reduce the total thickness of the steel layers by 70% and the total submerged weight by approximately 50% relatively to a comparable full-steel separator adapted for installation at, for example, 3 000 m water depth. The sandwich structure has a very high robustness towards fabrication tolerances and allows large flexibility for the design of separation outfit. In particular, the vessel can be constructed without external stiffener rings which are regarded as essential for large diameter full-steel subsea separators.

The predetermined collapse resistance means the nominal collapse pressure the vessel is able to withstand without internal counterpressure. The findings according to the invention have shown that it is possible to describe the collapse resistance of a sandwich shell large diameter vessel through a semi-empirical equation to allow dimensioning of the vessel for ultra deep water application. The equation has been validated by numerical modelling and testing. Assuming that there is no internal pressure, the predetermined collapse resistance is determined as:

$$p_c = \frac{4}{\sqrt{3}} \frac{f_y}{OD} \frac{\left[2t_s + t_c \frac{E_c}{E_s}\left(\frac{t_c}{2t_s}\right)^{\frac{2}{3}}\right]}{\left[1 + \frac{(ID_{max} - ID_{min})}{2(t_s + t_c)}\right]}$$

Within this context, the parameters defining the collapse resistance are:

$p_c$: the predetermined or nominal collapse resistance or the vessel with zero internal pressure;

$f_y$: the yield strength of the steel material of the inner and the outer steel layer;

OD: the outer diameter of the tubular portion of the shell;

$p_s$: the thickness of the inner steel layer and the outer steel layer; It is assumed that the layer thickness is identical for the inner and the outer steel layer;

$t_c$: the thickness of the concrete layer under the assumption that the thickness is larger than 2 $t_s$;

$E_c$: Young's modulus for the concrete material of the concrete layer (long term value);

$E_s$: Young's modulus for the steel material of the inner and the outer steel layer;

$ID_{max}$: the maximum internal diameter of the shell, e.g. the inner steel layer;

$ID_{min}$: the minimum internal diameter of the shell.

The equation allows to estimate the influence material properties will have on the collapse resistance in order to fulfil safety requirements as recommended by the Det Norske Veritas publication DNV-RP-F 301 mentioned above.

A general requirement is that the uniaxial compressive strength of the concrete material should not be lower than the external pressure. Of course, the pressure of the maximum allowable water depth should be less than the predetermined collapse resistance $p_c$ divided by a safety factor of, for example, more than 1.3 in particular 1.5 which, for example, means that the predetermined collapse resistance of a separator vessel designed for 3 000 m water depth should be at least 45 MPa corresponding to approximately 4 500 m water depth.

The findings according to the invention have shown that the equation mentioned above can be fulfilled with commonly available material if the outer/inner diameter of the shell is less than 5 m and the predetermined collapse resistance $p_c$ of the shell is between 30 and 60 MPa.

The thickness $t_s$ of the steel layers and the yield strength $f_y$ of the steel material are interrelated to each other. An optimum with respect to the submerged weight of the vessel is obtained if each of the inner steel layer and the outer steel layer has a thickness $t_s$ of not more than 50 mm and consists of steel having a yield strength $f_y$ of at least 500 MPa. Preferably, the inner steel layer and the outer steel layer has a thickness $t_s$ of at least 25 mm and further preferably, the inner steel layer and the outer steel layer have equal thickness.

The concrete layer is designed to distribute the applied external pressure and to create a composite action between the inner and outer steel layer. The $E_c/E_s$ ratio within the equation is important for the achievement of the composite action. As the Young's modulus of steel $E_s$ is fairly constant, the requirement for raising the $E_c/E_s$ ratio has to be put on the concrete modulus $E_c$. Preferably, the concrete layer consists of concrete having a compressive strength of more than the predetermined collapse resistance $p_c$ of the vessel, and/or having a Young's modulus $E_c$ of more than 12 GPa under longterm conditions. The short term value of the Young's modulus $E_c$ of the concrete material is preferably higher than 12 GPa, in particular higher than 20 GPa. The Young's modulus for the concrete material results in a high concrete stiffness preferred for sufficient pressure distribution between the inner steel layer and the outer steel layer.

As can be seen from the equation, the collapse resistance can be improved by raising the thickness $t_c$ of the concrete layer. To also provide for a low submerged weight, the thickness $t_c$ of the concrete layer is preferably larger than a total thickness of the inner steel layer and e.g. plus the outer steel layer, and further preferably less than twice the total thickness of the steel layers.

To reduce the submerged weight of the vessel, the concrete layer preferably consists of concrete having a density in a range of 1 400 to 2 600 kg/m$^3$, in particular of about 1 850 kg/m$^3$. Using light-weight aggregate concrete considerably lowers the submerged weight of the separator which is important for installation and retrieval of the separator modules in ultra deep water conditions.

The ovality or out-of-roundness of the cylindrical tubular portion of the shell influences the predetermined collapse resistance $p_c$ of the vessel. The out-of-roundness or ovalisation is defined as $(ID_{max}-ID_{min})/ID*100\%$, e.g. the ratio between the perimeter deviation from a circle of the cylindrical tubular portion of the shell and nominal inner diameter ID. The ovality influences the predetermined collapse resistance. Raising the ovality will lower the collapse resistance.

Preferably, the inner steel layer and thus the shell at the tubular portion thereof has an inner diameter out-of-roundness of less than about 2.0% of the nominal inner diameter and in particular of less than about 1.0% Keeping the dimensional tolerances within these limits lead to a predictable predetermined collapse resistance and to a predictable pressure safety margin of the separator. It is a major advantage of the sandwich shell separator that the ovality is considerably higher than the allowable ovality of a full steel shell separator. While the maximum allowable ovality of the full steel shell separator realistically may be 1.0%, the sandwich shell separator can be specified with an ovality limit of 2.0%. Hence, a benefit of the sandwich shell concept is that larger ovalities and thus larger fabrication tolerances can be accepted compared with a full steel shell configuration.

In order to keep the tolerances of the radial distance between the inner steel layer and the outer steel layer low, a plurality of spacer elements may extend through the concrete layer between the inner steel layer and the outer steel layer.

Though the separator according to the invention is intended for ultra deep water applications, the outer steel layer preferably is free of stiffening rings enclosing the outer circumference of the tubular portion of the shell. Contrary to the prior art full-steel shell concept, which necessitates stiffening rings, the sandwich shell concept according to the invention renders stiffening rings unnecessary.

The fluid inlet and outlet ports are fixed to the shell. In a preferred embodiment, each of the ports comprises a tube portion which extends through the shell and is sealingly welded to the inner steel layer and the outer steel layer. The same applies for nozzles and the like, which may be provided on the vessel. The tube portion seals the concrete layer against the through opening of the port.

In order to reliably provide for the predetermined collapse resistance, it is important that the out-of-roundness of the cylindrical tubular portion of the shell can be held within ovality tolerances as specified above, and it is further important that the concrete completely fills the space between the inner steel layer and the outer steel layer. Under a second aspect, the invention provides for a method for producing a subsea gravity separator as described above. In order to keep the construction tolerances within close limits, and to allow complete filling of the shell, the method according to the second aspect of the invention comprises the steps of:

a) providing an inner steel layer and an outer steel layer of a shell of a vessel having a cylindrical tubular portion and closure portions at axially both ends of the tubular portion such that the inner steel layer and the outer steel layer are arranged co-axially with an axis of the tubular portion extending vertically and further providing a plurality of ports extending through both the inner steel layer and the outer steel layer, b) continuously injecting concrete of initial fluid consistency through an injection port penetrating the outer steel layer at the bottom of the shell to completely fill any free volume between the inner steel layer and the outer steel layer, and c) closing the injection port and a venting port penetrating the outer steel layer at the top of the shell.

The cylindrical tubular portion of the shell is erected in upright position and thus the weight of the steel layers does not influence the roundness of the tubular portion. The concrete is injected under high pressure at the bottom of the shell while air trapped in the shell is vented at the top to completely fill the space between the inner and the outer steel layers. Concrete material with self-compacting properties is preferable, but of course, application of surface vibrators on the outer steel layer is optionally.

In a preferred improvement, the step a) mentioned above can further comprise providing a plurality of pairs of cylindrical tubular steel rings with a first steel ring of each pair having a diameter corresponding to the diameter of the inner steel layer at the tubular portion of the shell and a second steel ring of each pair having a diameter corresponding to the diameter of the outer steel layer of the tubular portion, and co-axially arranging the pairs of steel rings one above the other while welding a lower edge of each steel ring to an upper edge of a portion of the inner steel layer and the outer steel layer, respectively, which formerly has been provided.

Preferably, the rings are made of steel sheet material rolled to form a cylinder. By dividing the tubular portion the of shell into a plurality of rings welded together, the tolerances of out-of-roundness can be improved.

In a preferred embodiment, the inner steel layer and the outer steel layer at the cylindrical tubular portion of the shell are co-axially fixed to each other by means of spacer elements. Preferably, step a) as mentioned above further comprises welding a plurality of radially extending spacer elements between the first and the second steel ring of each pair of steel rings. The pair of steel rings thus can be completed to a unit before welding the pair of steel rings to the shell.

In the following, a preferred embodiment of the invention is described with reference to the attached drawings, of which FIG. 1 shows an schematic longitudinal section through a large diameter subsea separator for ultra deep water applications along a longitudinal axis of its cylindrical vessel;

FIG. 2 shows a cross-section of the separator seen along a line II-II in FIG. 1;

FIG. 3 shows a detail of the cross-section marked with an arrow III in FIG. 2;

FIG. 4 shows a detail of a port of the separator marked with an arrow IV in FIG. 1;

FIG. 5 shows a sketch explaining the production of the vessel of the separator; and FIG. 6 shows a cross-section through the vessel along a line VI-VI in FIG. 5.

FIGS. 1 to 4 show in principle a large diameter subsea gravity separator for ultra deep water applications at a water depth between 2 000 and more than 4 000 m, for example 3 000 m. The separator comprises an elongated vessel 1 with a cylindrical tubular portion 3 which axially on both ends is closed by hemispherical closure portions 5. As common in the separator technology, the vessel 1 has a fluid inlet port 7 and at least two fluid outlet ports 9, 11 at a distance from the fluid inlet port 7. The fluid outlet ports 9, 11 are staggered in vertical direction along the axis of the vessel 1 which is arranged horizontally under operation conditions. Due to gravity, the components of a multi-phase fluid entering the fluid inlet port 7 will separate while flowing along the vessel 1 such that components of different density will leave the vessel 1 through different fluid exits. As common with the petroleum production, the separator will be used to separate gas and/or water from a multi-phase flow of oil. The separator 1 is normally used with its cylindrical axis oriented horizontally, but in particular for gas separation, the separator 1 can be mounted vertically. The separator 1 includes built-in devices not shown, for example weir plates, coalescing plates, foam breaker plates, mist extractors or the like, as it is known in the art.

In order to allow effective and robust fluid separation, the vessel 1 has an internal volume of at least 50 to 80 m³, an outer diameter OD between 2 and 5 m and a length L of the tubular portion 3 of at least 10 m, for example 15 to 18 m.

As shown in detail in FIG. 3, the vessel 1 has an overall sandwich shell 13 with an inner steel layer 15, an outer steel layer 17 which completely encloses the inner steel layer 15 at a constant distance thereof, and a concrete layer 19 which completely fills the space between the steel layers 15, 17. The steel layers 15, 17 are of an equal thickness $t_s$ of about 25 mm to 50 mm and are made of a steel material having a yield strength $f_y$ of at least 500 MPa and a Young's modulus of approximately 210 GPa.

The inner steel layer 15 preferably is made of steel material having a better corrosion robustness than the steel material of the outer steel layer 17. Alternatively, the inner steel layer 15 (or at least a part thereof) can be provided with a corrosion resistant cladding or lining.

The concrete layer 19 has a thickness $t_c$ which is larger than 2 $t_s$ and less than 4 $t_s$. The concrete material of the concrete layer 19 is chosen to have a longterm Young's modulus $E_c$ of more than 12 GPa and a short time modulus of more than 20 GPa.

Tests have demonstrated that a sufficient shear strength is achieved at the steel-concrete interfaces by degreasing the surfaces of the steel layers 15, 17 facing the concrete layer 19. Further treatment has turned out to be unnecessary.

The materials of the sandwich shell 13 are chosen to have a nominal or predetermined collapse resistance between 30 and 60 MPa under the condition of no internal pressure. Taking in account a safety margin of a factor 1, 5, the vessel 1 can be used as a separator under ultra deep water conditions between 2 000 and 4 000 m. Corresponding thereto the compressive strength $f_c$ of the concrete material should exceed this nominal collapse resistance. In order to reduce the submerged weight of the vessel 1, the density of the concrete material of the concrete layer 19 is between 1 400 kg/m³ and 2 600 kg/m³, preferably about 1850 kg/m³.

FIG. 4 shows details of the ports, here port 11. The construction of the other ports and/or of nozzles and the like penetrating the sandwich shell 13 is similar. The port 11 comprises a tube portion 21 which extends through the inner steel layer 15, the outer steel layer 17 and the concrete layer 19 and is sealingly welded along its circumference both to the inner steel layer 15 and the outer steel layer 17. On the outer end of the tube portion 21, a connecting flange 23 is provided.

To withstand external pressure, the ovality or out-of-roundness of the cylindrical tubular portion 3 of the vessel 1 has to be less than 1.5% of the nominal inner diameter ID and preferably less than 0.5% at least initially. To comply with these tolerances, the vessel 1 is assembled from a plurality of ring units 25 which are subsequently welded together with the vessel 1 in an upright position with the axis of the tubular portion 3 of the vessel 1 extending vertically as shown in FIGS. 5 and 6. In this way, the weight of the ring units 25 acts in axial direction and does not deteriorate the ovality of the rings.

Each ring unit 25 comprises an inner cylindrical tubular steel ring 27 and an outer cylindrical tubular steel ring 29 which match the diameter of the inner steel layer 15 and the outer steel layer 17, respectively. To coaxially maintain a predetermined distance between the inner steel ring 27 and the outer steel ring 29, a plurality of radially extending spacer elements 31 are welded in between the steel rings 27, 29. The steel rings 27, 29 are rolled from steel sheet material into a cylindrical shape and are welded one above the other at their lower edges to an upper edge of a portion of the shell provided before as indicated, for example, at 33 in FIG. 5.

During assembly, the vessel 1 is supported on a base 34 fixing the lowermost portion of the vessel 1, here with its lower closure portion 5. Of course, also the lowermost ring unit 25 can be directly supported on the base 34 and the closure portion 5 can be mounted to the tubular portion 3 after complete assembly of the tubular portion 3.

To completely fill the space between the inner steel layer 15 and the outer steel layer 17, an injection port 35 penetrating the outer steel layer 17 is provided at the bottom of the upright positioned shell for injecting under pressure concrete material of initial fluid consistency. At the top of the shell, the outer steel layer 17 is provided with a vent port 37 through which air, which is trapped in the space between the steel layers 15, 17, can escape. After having completely filled the volume between the steel layers 15, 17 with concrete, the ports 35, 37 are permanently closed.

The invention claimed is:

1. Subsea gravity separator comprising a vessel having a shell which defines a cylindrical tubular portion and closure portions at both ends of the tubular portion, the vessel further having a fluid inlet port and at least two fluid outlet ports,
    wherein the tubular portion has an inner diameter of at least 2 m and an axial length of at least 10 m,
    wherein the shell is a sandwich shell which is dimensioned to provide for a predetermined collapse resistance of at least 30 MPa and comprises an inner steel layer, an outer steel layer and a concrete layer supported between the inner steel layer and the outers steel layer providing composite action between the inner and the outer steel layer.

2. Separator according to claim 1, wherein the inner diameter of the shell is less than 5 m and the predetermined collapse resistance of the shell is between 30 and 60 MPa.

3. Separator according to claim 2, wherein each of the inner steel layer and the outer steel layer has a thickness of not more than 50 mm and consists of steel having a yield strength of at least 500 MPa.

4. Separator according to claim 2, wherein the concrete layer consists of concrete having at least one parameter of a compressive strength of more than the predetermined collapse resistance of the vessel and a Young's modulus of more than 12 GPa.

5. Separator according to claim 1, wherein each of the inner steel layer and the outer steel layer has a thickness of not more than 50 mm and consists of steel having a yield strength of at least 500 MPa.

6. Separator according to claim 5, wherein each of the inner steel layer and the outer steel layer has a thickness of at least 25 mm.

7. Separator according to claim 6, wherein the inner steel layer and the outer steel layer are of equal thickness.

8. Separator according to claim 5, wherein the inner steel layer and the outer steel layer are of equal thickness.

9. Separator according to claim 5, wherein the concrete layer consists of concrete having at least one parameter of a compressive strength of more than the predetermined collapse resistance of the vessel and a Young's modulus of more than 12 GPa.

10. Separator according to claim 1, wherein the concrete layer consists of concrete having at least one parameter of a compressive strength of more than the predetermined collapse resistance of the vessel and a Young's modulus of more than 12 GPa.

11. Separator according to claim 1, wherein the thickness of the concrete layer is larger than a total thickness of the inner steel layer and the outer steel layer and is less than twice the total thickness.

12. Separator according to claim 1, wherein the concrete layer consists of concrete having a density in a range of 1400 to 2600 kg/m$^3$.

13. Separator according to claim 1, wherein the inner steel layer at the tubular portion of the shell has an inner diameter out-of-roundness of less than about 2.0%.

14. Separator according to claim 13, wherein the inner steel layer at the tubular portion of the shell has an inner diameter out-of-roundness of less than about 1.0%.

15. Separator according claim 1, further comprising a plurality of spacer elements extending through the concrete layer between the inner steel layer and the outer steel layer.

16. Separator according to claim 1, wherein each of the ports comprises a tube portion, which extends through the shell and is sealingly welded to the inner steel layer and the outer steel layer.

17. Separator according to claim 1, wherein the outer steel layer is free of stiffening rings enclosing the outer circumference of the tubular portion of the shell.

18. Method for producing a subsea gravity separator according to claim 1, comprising the steps of:
    a) providing an inner steel layer and an outer steel layer of a shell of a vessel having a cylindrical tubular portion and closure portions at axially both ends of the tubular portion such that the inner steel layer and the outer steel layer are arranged coaxially with an axis of the tubular portion extending vertically and further providing a plurality of ports extending through both the inner steel layer and the outer steel layer,
    b) continuously injecting concrete of initial fluid consistency through an injection port penetrating the outer steel layer at the bottom of the shell to completely fill any free volume between the inner steel layer and the outer steel layer, and
    c) closing the injection port and a venting port penetrating the outer steel layer at the top of the shell.

19. Method according to claim 18, wherein step a) further comprises providing a plurality of pairs of cylindrical tubular steel rings with a first steel ring of each pair having a diameter corresponding to the diameter of the inner steel layer at the tubular portion of the shell and a second steel ring of each pair having a diameter corresponding to the diameter of the outer steel layer at the tubular portion and coaxially arranging the pairs of steel rings one above the other while welding a lower edge of each steel ring to an upper edge of a portion of the inner steel layer and the outer steel layer, respectively, which was formerly provided.

20. Method according to claim 19, wherein step a) further comprises welding a plurality of radially extending spacer elements between the first and second steel ring of each pair of steel rings.

* * * * *